United States Patent [19]

Kamon

[11] Patent Number: 5,272,494
[45] Date of Patent: Dec. 21, 1993

[54] SYNTHETIC RESIN TEMPLE WITH A LONGITUDINAL CORE MEMBER FOR EYEGLASSES

[75] Inventor: Takumi Kamon, Sabae, Japan

[73] Assignee: Kyowa Optical Co., Ltd., Fukui, Japan

[21] Appl. No.: 947,824

[22] Filed: Sep. 21, 1992

[30] Foreign Application Priority Data

May 14, 1992 [JP] Japan .................. 4-031859[U]

[51] Int. Cl.⁵ .............................................. G02C 5/14
[52] U.S. Cl. ...................... 351/111; 359/114; 359/117; 359/119; 359/121
[58] Field of Search ............... 351/111, 114, 117, 119, 351/121

[56] References Cited

U.S. PATENT DOCUMENTS 4,792,221 12/1988 Parks et al. ..................... 351/119

FOREIGN PATENT DOCUMENTS 3-60314 6/1991 Japan .

Primary Examiner—Bruce Y. Arnold
Assistant Examiner—James Phan
Attorney, Agent, or Firm—Birch, Stewart, Kolasch & Birch

[57] ABSTRACT

According to the present invention, there is disclosed an improved synthetic resin temple for eyeglasses having: a longitudinal core member; one half-hinge piece with an eye plate formed thereon; and synthetic resin covering, where the front end portion of the core member is fitted to a groove on the outward surface of the one half-hinge piece, the core member and the half-hinge piece are coupled together by molding with the synthetic resin covering, with a butt end face formed at the front end portion of the temple by cutting, for holding the temple against the lens-frame at the butt end face. The improvements are provided in that: the one half-hinge piece has rugged faces formed on the outward surface thereof at areas on both sides adjacent to the groove; the one half-hinge piece has a longitudinally extending raised portion formed on the inward surface thereof, with the eye plate disposed on the raised portion of the inward surface; the covering around the front end portion of the temple is partially removed so as to enable the eye plate of the other half-hinge piece of the hinge to pivot and the covering to cover the outward, sideward, and inward surfaces of the one half-hinge piece except for the eye plate.

10 Claims, 3 Drawing Sheets

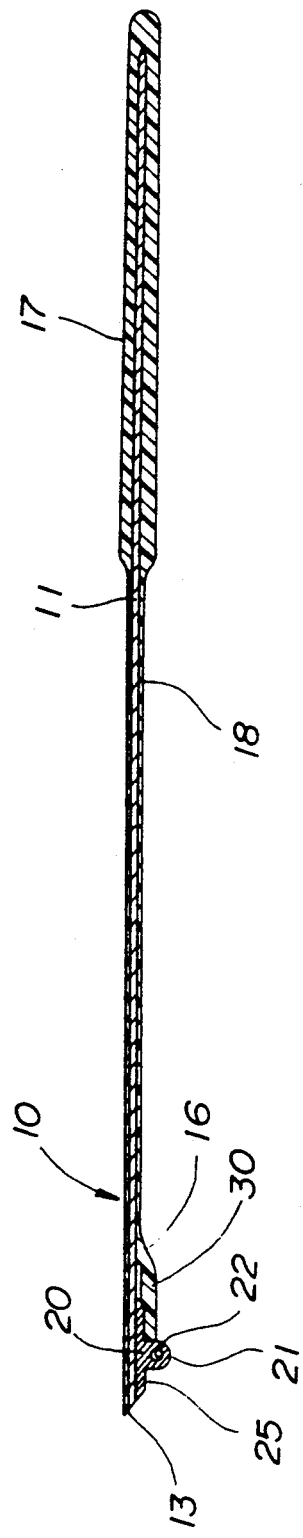

SYNTHETIC RESIN TEMPLE WITH A LONGITUDINAL CORE MEMBER FOR EYEGLASSES

BACKGROUND OF THE INVENTION

1. Field of the Invention

The present invention relates to improvements in a synthetic resin temple for eyeglasses in which a longitudinal core member and one half-hinge piece of a hinge are coupled together by molding, where one half-hinge piece means one of a pair of hinge plates constituting a hinge.

2. Description of the Prior Art

A prior synthetic resin temple for eyeglasses in which a longitudinal core member and one half-hinge piece of a hinge are coupled together by molding, is disclosed in Japanese Utility Model Unexamined Publication No. (JP-U) HEI-3-60314.

The disclosed temple is provided with: one half-hinge piece of a hinge which has a core member fitting groove, or a groove for fitting a core member of the temple thereto, formed on the outward surface, or opposite-to-wearer's face side surface, thereof, extending longitudinally; a longitudinal metallic core member having either circular or rectangular cross-section; and synthetic resin covering. The front end portion of the core member is fitted to the groove, then, the one half-hinge piece and the front end portion of the core member are covered around and coupled together by molding with the covering so as to form the front end portion of the temple. The mid and rear portions of the core member are also covered around with the covering by molding so as to form the mid and rear portions of the temple.

The one half-hinge piece has an eye plate formed on the inward surface, or wearer's face side surface, thereof such that the eye plate is arranged to protrude from the covering, whereby the one half-hinge piece disposed on the temple and the other half-hinge piece of the same hinge disposed on a lens-frame of the eyeglasses adjacent to the temple are coupled together by joining the eye plate of the temple and an eye plate disposed on the lens-frame through a pin so as to constitute a hinge, through which the temple and the lens-frame are pivotably connected.

In a finishing process in the temple manufacturing, part of the synthetic resin covering on the inward surface of the front end portion of the temple around the eye plate is removed to expose the inward surface of the one half-hinge piece so as to enable the eye plate of the lens-frame to pivot around without interruption from the covering, thereby only the outward and sideward surfaces thereof remaining covered by the synthetic resin covering. Then, a butt end face is formed at the front end portion of the temple by having a front end part of the front end portion of the temple cut at a predetermined angle and at a predetermined position thereon on the front side of the eye plate, whereby the temple is enabled to be held at the butt end face against the lens-frame of the eyeglasses to which the temple is connected, so as to limit the opening angle of the temple with respect to the lens-frame, to a predetermined value.

The prior art temple for the eyeglasses has a disadvantage in that, when the eyeglasses are being used, the temples on both sides of the eyeglasses tend to be pressed open by the wearer's face, whereby bending force is generated and loaded on each temple, which, in turn, acts as a peeling force on the edge of the butt end face at the front end portion of each temple, for removing the synthetic resin covering and the longitudinal core member from the one half-hinge piece coupled together with the core member by molding with the covering, subsequently it being likely to result in defective temples with the synthetic resin covering peeled off from the one half-hinge piece at the butt end face at the front end portion of the temple. The present invention is made to solve such problem.

SUMMARY OF THE INVENTION

It is therefore an object of the present invention to provide a synthetic resin temple for eyeglasses having a longitudinal core member fitted to a groove formed on the outward surface of a half-hinge piece and coupled together by molding with synthetic resin covering, in which the synthetic resin covering does not peel off from the half-hinge piece while the eyeglasses are being worn by a wearer.

In order to solve the problem described above, according to the present invention, there is provided an improved synthetic resin temple for eyeglasses having a longitudinal core member fitted to a groove formed on the outward surface of one half-hinge piece and coupled together by molding with synthetic resin covering, in which the improvements include that the one half-hinge piece has rugged faces formed on the outward surface thereof at areas on both sides adjacent to the groove such that highly increased adhesiveness, high enough to prevent peeling off of the covering, is obtained between the one half-hinge piece and the covering molded therearound. In one embodiment of the present invention, the rugged faces described above are formed so as to be of a saw tooth-shaped longitudinal section. Furthermore, in the improvements, the one half-hinge piece has a longitudinally extending raised portion formed on the inward surface thereof at the central area thereof such that the eye plate is disposed on the raised portion. After the one half-hinge piece and the longitudinal core member of the temple are coupled together by molding with synthetic resin covering, according to the present invention, the synthetic resin covering around the front end portion thereof between the front end of the temple and the rear side of the eye plate is finished by partially removing the covering such that the eye plate of the other half-hinge piece of the hinge disposed on the lens-frame of the eyeglasses is enabled to pivot without interruption from the covering, and the finished covering remains to cover around the outward, sideward and inward surfaces of the one half-hinge piece except for the eye plate area.

Thus, in the temple formed as described above according to the present invention, since adhesiveness is highly increased between the outward surface of the one half-hinge piece and the synthetic resin covering molded therearound, resulting from the rugged faces formed on the outward surface of the half-hinge piece, and since the synthetic resin covering is arranged to cover the inward surface of the one half-hinge piece in addition to the outward and sideward surfaces, as described above, the synthetic resin covering is most unlikely to peel off at the butt end face at the front end portion of the temple and, thereby, resulting in the one half-hinge piece being most unlikely to be caused to fall apart, though the respective cut faces of the longitudinal core member, the one half-hinge piece, and the synthetic resin covering, are exposed at the butt end face at the front end portion of the temple, as in the case of the prior art temple.

Therefore, the temple, according to the present invention, has an advantage in that, such peeling off of the synthetic resin covering at the butt end face at the front end portion of the temple and such falling apart of the one half-hinge piece resulting therefrom as described above, are prevented from occurring, which is contrary to the prior art temple where the synthetic resin covering was likely to peel off at the butt end face at the front end portion of the temple and, thereby, the one half-hinge piece was likely to be caused to fall apart since the adhesiveness between the outward surface of the one half-hinge piece and the synthetic resin covering was not high enough to prevent the peeling off, and the synthetic resin covering covered only the outward and sideward surfaces of the one half-hinge piece but not the inward surface thereof at all.

Furthermore, because of the advantage described above, the temple according to the present invention, the synthetic resin covering of the temple may be advantageously made thinner than in the case of the prior art temple, whereby resulting in a temple keeping comfortableness on the wearer of touch of such covering with lighter weight.

As an aspect of the present invention, a temple for eyeglasses formed according to the present invention, as described above, is further provided such that the synthetic resin covering around the mid portion, between the front and rear portions, of the longitudinal core member is formed so as to have thickness of not more than 25% of the maximum horizontal dimension of the cross-section of the longitudinal core member, enabling the temple to have bending elasticity substantially equal to that of the longitudinal core member. Thus, according to the present invention, the fitness to the wearer's facial construction of the temple, substantially as good as in the case of a temple having a spring-type hinge, can be obtained without being equipped with a spring-type hinge.

BRIEF DESCRIPTION OF THE DRAWINGS

The present invention will become more fully understood from the detailed description given hereinbelow and the accompanying drawings which are given by way of illustration only, and thus, are not limitative of the present invention, in which:

FIG. 2 is a longitudinal sectional plan view of the temple of FIG. 1;

FIG. 3 is an enlarged cross-sectional view of the temple of FIG. 1, taken along the line III—III;

DESCRIPTION OF THE PREFERRED EMBODIMENTS

The present invention will be described, in detail, according to embodiments referring to the accompanying drawings.

Figure 1:
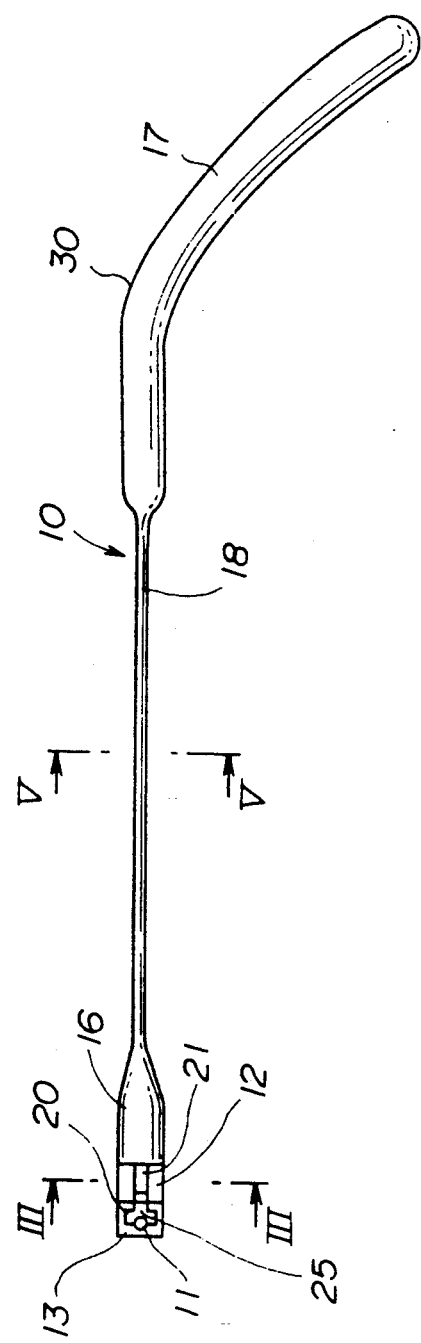
FIG. 1 is an elevational side view of an embodiment of the improved synthetic resin temple for eyeglasses in accordance with the present invention.

As shown in FIGS. 1 and 2, an improved synthetic resin temple 10 for eyeglasses, according to an embodiment of the present invention, includes: one half-hinge piece 20 having a core member fitting groove 23, or a groove 23 for fitting a longitudinal core member 11, formed on the outward surface 14 of the one half-hinge piece 20, extending longitudinally; the longitudinal core member 11 having the front end portion thereof fitted to the groove 23; and synthetic resin covering 30.

The one half-hinge piece 20 and the front end portion of the core member 11 are coupled together by molding, such as insert molding, with the covering 30 so as to form the front end portion 16 of the temple 10. The mid and rear portions of the core member 11 are covered around with the covering 30 by molding so as to form the mid and rear portions 18, 17 of the temple 10. The one half-hinge piece 20 may be of metallic material. The longitudinal core member 11 may be of metallic material, or steel, or in particular, such as piano wire having a circular cross-section with 1 mm diameter. The synthetic resin covering 30 may be of polyamide. The one half-hinge piece 20 has an eye plate 21 formed on the inward surface 15 thereof substantially at 90 degrees to the inward surface 15 such that the eye plate 21 is arranged to protrude from the covering 30 so as to be joined to an eye plate of the other half-hinge piece (not shown) of the hinge disposed on a lens-frame (not shown) through a hinge pin (not shown), thereby the temple 10 and the lens-frame are adapted to be pivotably connected, for constituting the eyeglasses. The eye plate 21 has a through pin hole 22 formed thereon for the hinge pin to be set therethrough.

The temple 10 further has a butt end face 13 formed at the front end portion 16 thereof by having a front end part of the front end portion 16 thereof cut at a predetermined angle, such as 45 degrees, and at a predetermined position thereon on the front side of the eye plate 21, such as a position immediately adjacent to the front side of the eye plate 21, such that the temple 10 is enabled to be held at the butt end face 13 against the lens-frame of the eyeglasses at a predetermined angle, such as 90 degrees, to the lens-frame. The respective cut faces of the longitudinal core member, the one half-hinge piece, and the synthetic resin covering, are exposed at the butt end face at the front end portion of the temple. Thus, the temple 10 is formed generally.

Figures 4, 5:
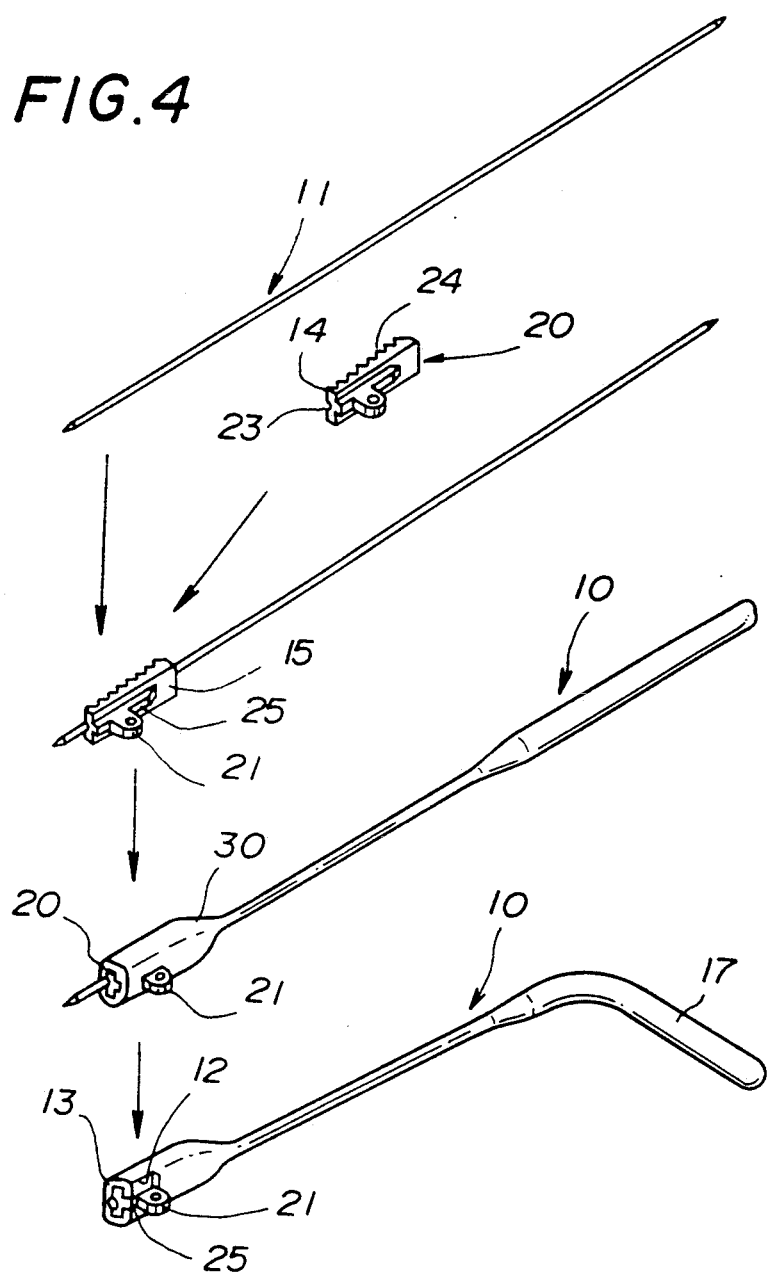
FIG. 4 is a series of perspective views showing a manufacturing process for the temple of FIG. 1.
FIG. 5 is an enlarged cross-sectional view of the temple of FIG. 1, taken along the line V—V.

The improvement, according to the present embodiment of the present invention, in the temple 10, will be described hereunder with reference to FIGS. 3 and 4 in addition to FIGS. 1 and 2. FIG. 3 shows a cross-sectional view of the front end portion 16 of the temple 10. FIG. 4 shows a manufacturing process for the temple 10 in a series of steps.

Shown separately at the top in FIG. 4 are the longitudinal core member 11 of piano wire having a diameter of 1 mm and the one half-hinge piece 20 of metallic material. The one half-hinge piece 20, which has the groove 23 formed on the outward surface 14 of the one half-hinge piece 20, extending longitudinally, so as to have semicircular cross-section to be fitted to the core member 11, as described above. The one half-hinge piece 20 further has, as the improvement, rugged faces 24, of a saw tooth-shaped longitudinal section, in particular in the present embodiment, formed on the outward surface 14 of the one half-hinge piece 20 at areas on both sides adjacent to the groove such that adhesiveness between the outward surface 14 of the one half-hinge piece 20 and the synthetic resin covering 30 when molded, is increased high enough to prevent the covering 30 from peeling off when the eyeglasses are being used.

In the improvement, the one half-hinge piece 20 also has a longitudinally extending raised portion 25 formed on the inward surface 15 of the one half-hinge piece 20 at a central area of the inward surface 15 such that the eye plate 21, having the pin hole 22, is disposed on the raised portion 25 of the inward surface 15.

As shown in the mid steps of FIG. 4, the front portion of the core member 11 is fitted, in half-way, in the groove 23 of the one half-hinge piece 20. Then, the fitted core member 11 and the one half-hinge piece 20 are coupled together by molding the resin 30 therearound, with the eye plate 21 portion protruding from the polyamide covering, in an insert molding process using such as an injection molding machine, in which, according to the present invention, the covering 30 covers around the outward, sideward, and inward surfaces of the one half-hinge piece 20 except for the eye plate 21 portion. At the same time, the mid and rear portions 18, 17 are also formed by molding the resin around the core member 11 so as to have respective predetermined shapes.

The improved temple 10 of a final, or finished, configuration, as shown at the bottom of FIG. 4, is obtained through a finishing process in which the covering 30 molded around the front end portion 16 of the temple 10 between the front end of the temple 10 and the rear side of the eye plate 20, is partially removed to such extent that the eye plate of the other half-hinge piece of the hinge disposed on the lens-frame of the eyeglasses, is enabled to pivot around without interruption from the covering 30, and the covering 30 remains to cover around the outward, sideward, and inward surfaces of the one half-hinge piece 20 except for the eye plate 21 portion. The extent of the removal, or finishing, of the covering 30 may be such that the finished inward surface 12 of the covering 30, around the front end portion 16 of the temple 10 between the front end of the temple 10 and the rear side of the eye plate 20, is at the same level as the raised surface of the raised portion 25.

Also in the finishing process, a butt end face 13 is formed, as described above, at the front end portion of the temple 10 by cutting a front end part of the front end portion of the temple 10 at a predetermined angle and at a predetermined position on the front side of the eye plate 21. The rear or ear-engaging portion 17 of the temple 10, molded as described above, is also finished by bending to form a bow, as shown in FIG. 4.

In the temple 10 so formed and finished, as described above, according to the present invention, since rugged faces 24, instead of flat faces in the case of the prior art temple, are formed on the outward surface of the one half-hinge piece 20, adhesiveness between the outward surface 14 of the one half-hinge piece 20 and the synthetic resin covering 30 when molded, is highly increased, whereby the outward surface 14 of the one half-hinge piece 20 and the synthetic resin covering 30 are firmly secured together. Also, in the improved temple 10, the covering 30 covers around the inward surface 15 in addition to the outward surface 14, and the sideward surfaces of the one half-hinge piece 20 except for the eye plate 21 portion, in contrast to the case of the prior art temple where only the outward surface and the sideward surfaces are covered by the covering, thereby providing higher resistance against peeling-off force generated by force tending to open the temples beyond the limited temple opening angle of the eyeglasses.

Therefore, in the improved temple 10, the peeling off of the synthetic resin covering 30 at the butt end face at the front end portion of the temple and the falling apart of the one half-hinge piece resulting therefrom, are prevented from occurring, while, in the prior art temple, the synthetic resin covering was likely to peel off at the butt end face at the front end portion of the temple and, thereby, the one half-hinge piece was likely to fall apart.

According to an aspect of the present invention, the temple 10 is provided in which the synthetic resin covering 30 molded around the longitudinal core member 11 to form the mid portion 18 of the temple 10, is advantageously arranged to have a thickness of not more than 25% of the maximum horizontal dimension of the cross-section of the longitudinal core member. In particular, according to the present embodiment, since the cross-section of the core member 11 is a circle, the maximum horizontal dimension of the cross-section is the diameter, which is 1 mm here, where the outside diameter of the mid portion 18 of the temple 10 is arranged to be at 1.5 mm, resulting in a covering thickness of 0.25 mm, or 25% of the diameter of the core member 11 (FIG. 5). A covering thickness of the range, as described above, which is very thin, enables the temple 10 to have bending elasticity substantially equal to that of the longitudinal core member 11 substantially without any decrease in elasticity caused by the synthetic resin covering 30. Therefore, without spring-type hinges, fitness of the temple 10, substantially as good as that of a temple having a spring-type hinge, may be obtained. Such thin covering 30 is made possible by the arrangement of the temple 10 according to the present invention, as described above, without likelihood of peeling-off of the covering 30. The cross-sectional dimensions of the rear portion 17 of the temple 10 are the width in the direction of the inward to outward surfaces of not more than 3 mm, and the width in the vertical direction of not less than 3 mm.

The present invention has been described based on an embodiment where the longitudinal core member 11 has a circular cross-section of steel, or piano wire material, and the rugged faces 24 formed on the outward surface 14 of the one half-hinge piece 20 are of a saw tooth-shaped longitudinal section. However, the present invention is not limited by such embodiment, but is applicable to cases of core members 11 of any other cross-section, such as a rectangular shape, where the groove 23 on the outward surface 14 of the one half-hinge piece 20 may be a semirectangular cross-section to match the cross-section of the core member, cases of core members 11 of any other metallic or non-metallic material, and cases of rugged faces 24 of any other configuration.

It will be also understood that various additional modifications may be made in the present embodiment, and it is intended to cover in the appended claims all such modifications as fall within the true spirit and scope of the present invention.

What is claimed is:

1. An improved synthetic resin temple for eyeglasses including: one half-hinge piece having outward, sideward, and inward surfaces, said one half-hinge piece having a core member fitting groove formed on the outward surface thereof so as to extend longitudinally; a longitudinal core member having the front end portion thereof fitted to said groove; and synthetic resin covering, such that said one half-hinge piece and said front end portion of said core member are coupled together by molding with said covering so as to form the front end portion of said temple, said one half-hinge piece having an eye plate formed on said inward surface thereof such that said eye plate protrudes from said covering, said temple further having a butt end face formed at the front end portion thereof by having a front end part of said front end portion thereof cut at a predetermined angle and at a predetermined position thereon on the front side of said eye plate such that said temple is enabled to be held at said butt end face against a lens-frame of said eyeglasses connected to said temple at a predetermined angle to the lens-frame, wherein the improvements are provided in that:

said one half-hinge piece has rugged faces formed on said outward surface thereof at areas on both sides adjacent to said groove such that adhesiveness is increased high enough between said outward surface of said one half-hinge piece and said covering, said one half-hinge piece has a longitudinally extending raised portion formed on said inward surface thereof at a central area of said inward surface such that said eye plate formed on said inward surface of said one half-hinge piece protrudes from said raised portion of said inward surface, said covering is molded around said front end portion of said temple so as to cover around said outward, sideward, and inward surfaces including said raised portion, said covering molded around said front end portion of said temple between the front end of said temple and the rear side of said eye plate is finished by partially removing said covering to such extent that the pivoting motion of the eye plate of the other half-hinge piece of said hinge disposed on said lens-frame is not interrupted by said covering, and said finished covering remains to cover around said outward, sideward, and inward surfaces of said one half-hinge piece except for said eye plate portion.

2. The temple according to claim 1, in which material of said half-hinge piece and said longitudinal core member is metallic material.

3. The temple according to claim 2, in which said longitudinal core member has a circular cross-section.

4. The temple according to claim 2, in which said longitudinal core member has a rectangular cross-section.

5. The temple according to claim 2, in which said rugged faces are of a saw tooth-shaped longitudinal section.

6. The temple according to claim 1, in which material of said half-hinge piece is metallic material, and material of said longitudinal core member is steel.

7. The temple according to claim 1, in which said longitudinal core member has a circular cross-section.

8. The temple according to claim 1, in which said longitudinal core member has a rectangular cross-section.

9. The temple according to claim 1, in which said rugged faces are of a saw tooth-shaped longitudinal section.

10. The temple according to claim 1, in which the mid portion of said temple between said front end portion and the rear portion thereof has said covering around said longitudinal core member formed so as to have covering thickness of not more than 25% of the maximum horizontal dimension of the cross-section of said longitudinal core member.

* * * * *